(No Model.)
T. D. BOTTOME.
PROCESS OF CHLORIDIZING GOLD ORES.
No. 405,824. Patented June 25, 1889.
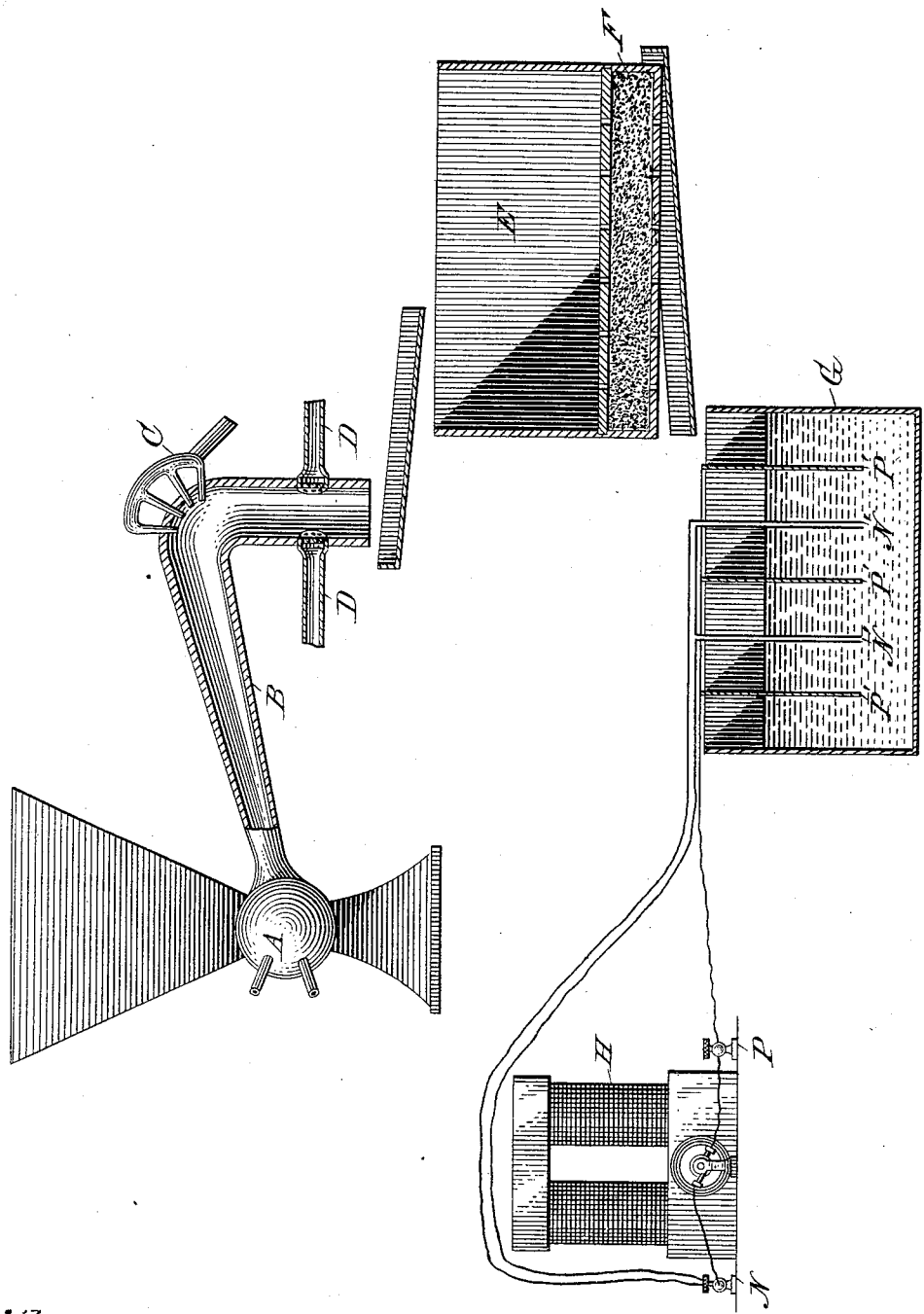
Witnesses:
D. P. Griffith,
W. F. Babcock
Inventor:
Thomas D. Bottome

UNITED STATES PATENT OFFICE.

TURNER D. BOTTOME, OF HOOSICK, NEW YORK, ASSIGNOR TO JOHN B. TIBBITS, OF SAME PLACE.

PROCESS OF CHLORIDIZING GOLD ORES.

SPECIFICATION forming part of Letters Patent No. 405,824, dated June 25, 1889.

Application filed December 28, 1888. Serial No. 294,883. (No specimens.)

*To all whom it may concern:*

Be it known that I, TURNER D. BOTTOME, a citizen of the United States, and a resident of Hoosick, in the county of Rensselaer and State of New York, have invented certain new and useful Improvements in the Process of Chloridizing Gold Ores, of which the following is a specification.

Hitherto the chlorination of gold-bearing ores has been effected by treating a bulk of powdered ore with chlorine gas, which usually takes several hours to penetrate the mass, and very often the larger particles of gold are not wholly converted to the chloride. The silver present is converted to the chloride, which is insoluble in water. The gold chloride was dissolved by adding water to the mass and filtering the solution into a larger tank, where, by the addition of iron sulphate, the gold was precipitated and thus recovered, while the insoluble silver chloride remained with the bulk of the ore and was thrown away, it being too expensive to attempt to save it by ordinary chemical means.

The object of my invention is to save all of the gold and silver and other precious metals—such as platinum, &c.—and to effect a very thorough chlorination rapidly and continuously with apparatus that is simple and cheaply made, and wherein no mechanically-moving parts are used.

Briefly stated, I have found that gold, silver, and other precious metals in a finely-pulverized and dissociated state become instantly converted to chlorides if acted on by pure chlorine gas in the presence of slight moisture, and also that chlorides of precious metals are dissolved easily in a solution of sodium thiosulphate, and the resulting metallic thiosulphates are readily decomposed by electrolysis.

To carry my invention into effect, reference may be had to the accompanying drawing, which forms part of this specification, in which—

A is a pulverizer.
B is a tubular chamber.
C is a system of atomizers.
D is a system of sprays.
E is a tank having a filter F.
H is a dynamo having terminals P and N.
G is an electrolytic tank having electrodes P' N', which are connected by wires to the respective terminals P and N of the dynamo H.

The operation is as follows: The ores are placed in the pulverizer A, (preferably a pneumatic device operated by superheated steam,) which reduces the ores to an impalpable powder, which is forced into the tubular chamber B by the pressure of the liberated steam. The floating and dissociated particles of ore when they have reached the point at C are subjected to the action of the system of atomizers, as shown at C, which treat the floating particles with pure chlorine gas and water in an atomized condition, the effect being to instantly convert the floating particles of metal into chloride of the metal. At this point the chlorinated ore falls by gravity through a system of sprays D, the effect of which is to thoroughly wet the ore and also to dissolve out the metallic chlorides present, by reason of a solution of sodium or other thiosulphate being used instead of water. The whole mass is then conducted into the filter-tank E, from which the solution passes through the filter F and is conducted into the electrolytic tank G. The thiosulphate-liquor now contains gold, silver, and possibly other precious metals in solution—such as platinum, &c.—and to recover the metals easily and quickly it is necessary to subject the solution to electrolysis, which is best accomplished by placing anodes P' of insoluble and conductive material—such as carbon—into the tank along with cathodes N', which may be of an easily-refined metal, such as copper. On connecting the electrodes P' and N' to the respective dynamo-terminals P and N, which may signify positive and negative, and passing a current from the dynamo H through the electrolyte, (the thiosulphate-liquor,) the metallic thiosulphates are decomposed, liberating and depositing the precious metals—gold, silver, &c.—in a metallic state on the cathodes, while sodium, being extremely oxidizable in water, is dissolved out as sodium oxide, only to become combined with the thiosulphate liberated to again form sodium thiosulphate in solution, which may be used over and over continuously. The waste ore in the filter-tank E, after being carefully washed, preferably with thiosulphate solution, is thrown away. A double set of tanks may be used, wherein one set is in action while the other set is being cleaned up, ready for subsequent action.

I do not wish to limit myself to sodium thiosulphate, as other thiosulphates may be found available; but they are usually more expensive, and for this reason I give preference to the sodium salt.

What I claim as my invention is as follows:

1. The process of chlorinating gold or silver ore by submitting the comminuted and dissociated ore to the action of dampened chlorine gas, dissolving the chlorides formed thereby in a solution of sodium thiosulphate, and reducing the metallic thiosulphates by electrolysis, substantially as described.

2. The process of recovering precious metals from their ores, consisting in pulverizing the ores to an impalpable powder with superheated steam, treating the warm disseminated floating ore with sprays of dampened chlorine, wetting the chlorinated ore with a solution of a thiosulphate, and subjecting the filtered liquor to the action of electrolysis, substantially as described.

3. The process of effecting a thorough and continuous chlorination of gold and silver bearing ores by submitting the finely-pulverized floating disseminated ore to the action of dampened chlorine gas, substantially for the purpose as herein described.

4. The process of treating ores of the precious metals, consisting in pulverizing the ores to an impalpable powder by superheated steam, forcing the powdered ore through a spacious chamber while subjecting the disseminated ore to the action of dampened chlorine, which is forced into the said chamber by means of atomizers, dissolving out the metallic chlorides formed thereby by submitting the powdered chlorinated ore to a bath of a strong thiosulphate-liquor, filtering the resulting metallic thiosulphate solution and subjecting it to electrolysis, substantially as herein described.

Signed at Hoosick, in the county of Rensselaer and State of New York, this 18th day of December, A. D. 1888.

TURNER D. BOTTOME.

Witnesses:
D. P. GRIFFITH,
GEO. H. MYERS.